Jan. 27, 1953 T. C. NORMAN 2,626,770
FISHING ROD HOLDER
Filed Aug. 25, 1950 2 SHEETS—SHEET 1

INVENTOR.
Thomas C. Norman
BY
Boyken, Mohler & Beckley
ATTORNEYS

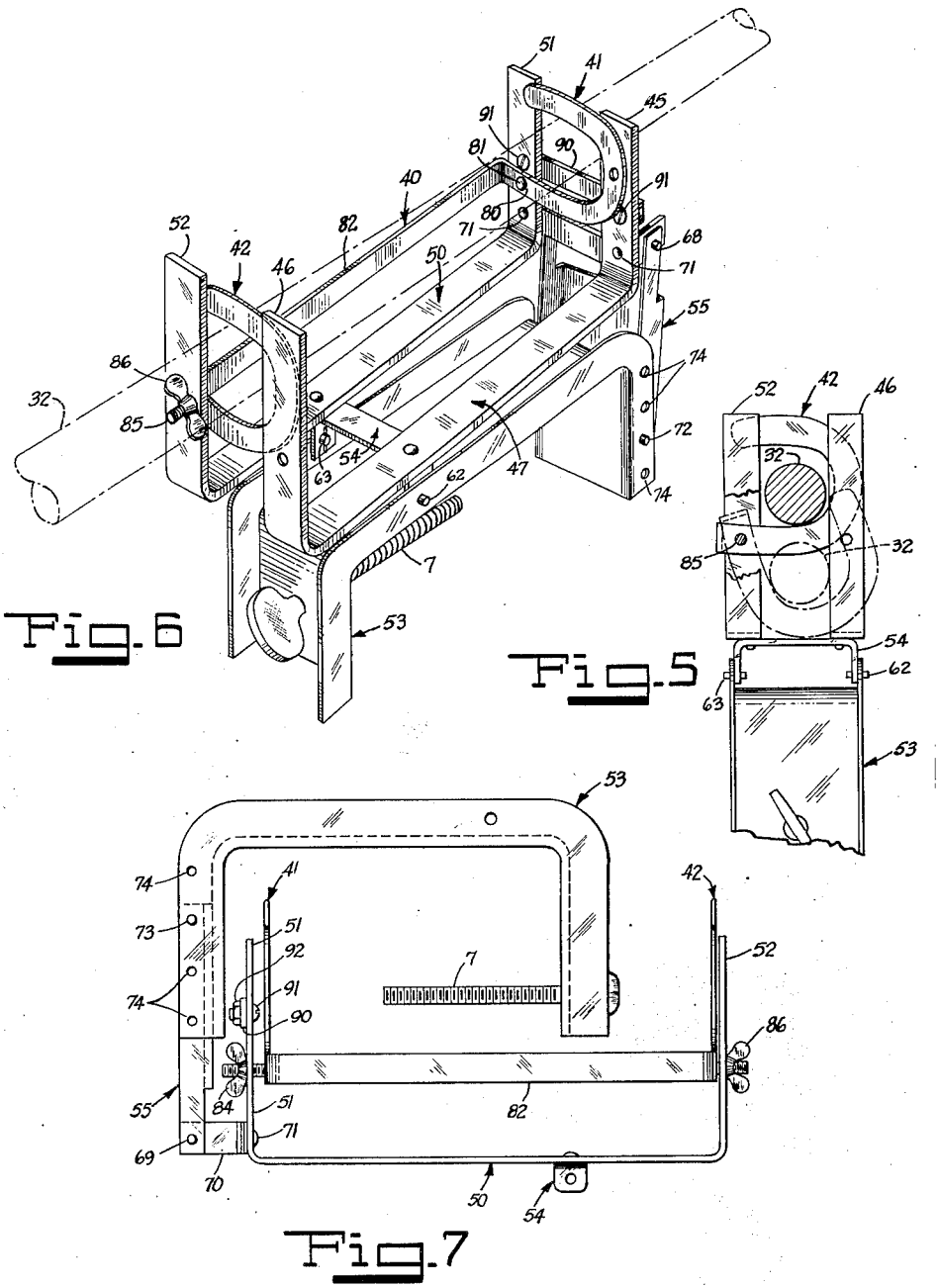

Patented Jan. 27, 1953

2,626,770

UNITED STATES PATENT OFFICE 2,626,770

FISHING ROD HOLDER

Thomas C. Norman, San Francisco, Calif.

Application August 25, 1950, Serial No. 181,345

2 Claims. (Cl. 248—40)

This invention relates to a fishing rod holder and has for one of its objects the provision of a holder which is adapted to hold a fishing rod firmly when in use and at the same time permit a quick removal of such rod when desired without manipulation of any fastening elements of any kind.

Another object of the invention is a holder which is adapted to hold the rod at spaced points along the length of the latter but which is sufficiently rugged to resist heavy loads tending to swing the rod in either a horizontal or vertical plane.

Yet another object of the invention is a holder which may be collapsed into a relatively small space to render the same more portable.

Other objects and advantages will be seen in the following specifications and from the drawings wherein:

Fig. 5 is an end elevational view of a modified form of the invention.

Fig. 6 is a perspective view of the modified form of Fig. 5.

Fig. 7 is a side elevational view of the device of Figs. 3–6 showing the same in collapsed position.

Figure 2:
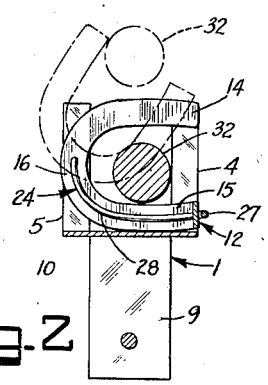
Fig. 2 is a transverse cross-sectional view through the device as taken along lines 2—2 of Fig. 1.
Figure 1:
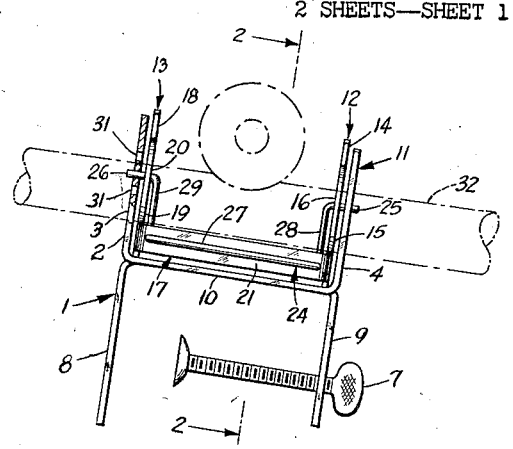
Fig. 1 is a side elevational view of the device.

In detail, the device of Figs. 1 and 2 comprises a base generally designated 1 which is preferably formed from a rectangular sheet of rigid material bent to form a support for the fishing rod holder and a C-clamp for securing the support to a fixed object such as the gunwale of a boat.

This sheet of rigid material such as steel is cut and bent to form a pair of upstanding forward legs 2, 3 and a pair of rear legs 4, 5. The words "forward" and "rear" are used with reference to the fishing pole, the butt end of the latter being adjacent the rear legs 4, 5 while the opposite or outer end of the pole is nearer the forward legs 2, 3.

These upstanding legs 2, 3, 4, 5 may be formed from the marginal portions adjacent opposite ends of the sheet of material while the central portions of the sheet may be bent downwardly to form a C-clamp having a pair of spaced jaws 8, 9 and a connecting frame member 10 which comprises the remainder of the sheet from which the legs 2, 3, 4, 5 and the jaws 8, 9 are formed. A thumb screw 7 may be threadedly secured through jaw 9 in the usual manner for engaging the object to which the device is to be secured.

The legs 2, 3, 4, 5 constitute a support, generally designated 11 for supporting the rod holding means which will now be described.

Between the front and rear legs of the support 11 are a pair of U-shaped members generally designated 12, 13. The member 12 comprises a pair of spaced opposed legs 14, 15 between which the fishing pole is adapted to be received (Fig. 2). A connecting piece 16 connects the legs 14, 15 at the closed end of the U-shaped member 12.

The member 13 is identical with member 12 and comprises legs 18, 19 corresponding to legs 14, 15 of member 12 and includes a connecting piece 20 at its closed end.

The members 12, 13 are preferably formed from one strip of rigid material 17 such as a light flat bar and are integrally secured together by an extension 21 which extends between the outer ends of the lower legs 15 and 19 of said members.

Pivot pins 25, 26 extend oppositely outwardly from the closed ends of members 12, 13 for swingably securing said members to the support 11. These pins 25, 26 may be rigidly secured as by riveting to the connecting pieces 16, 20 respectively but are preferably the opposite ends of a length of rod or wire 24 which extends along the outer side of extension 21 as at 27 and then passed through suitable openings in said extension and along the opposed faces of the lower legs 15, 19 of the members 12, 13 as at 28, 29 respectively. The connecting pieces 16, 20 are suitably apertured to pass the ends 25, 26 which ends in effect act as pins for swingably supporting the rod holding element 17. The upwardly extending rear leg 5 is apertured to pass the pin-like end 25 while the forward leg 3 is provided with a vertical row of holes 31 for adjustably positioning the end 26 as desired so that the rod holding means which comprises U-shaped members 12, 13 and extension 21 may be swingably secured at various angles to the horizontal to suit the desired angle of the fishing pole (Fig. 1).

From the above description it will be apparent that the fishing pole 32 may be inserted between the upper and lower legs of U-shaped members 12, 13 when the latter are swung upwardly into the dotted line position of Fig. 2. When said members are swung downwardly the pole will be securely held between said legs and between the forward legs 2, 3 and the rear legs 4, 5 of the support 11.

If the holder is to be designed for relatively light duty the members 12, 13 may be pressed together by the user to permit removal of pins 25, 26 from the support 11 or for removal of the forward pin 26 only to permit insertion of the same in any one of the holes 31 to suit the desired angle.

In heavier weight holders the members 12, 13 may not be sufficiently yieldable to permit the above operation in which case the wire 24 may be deflected to permit removal of the ends 25, 26 from the support 11 by pressing the portions 28, 29 together. Normally, the resiliency of the wire 24 and the flat bar 17 will be sufficient to hold the ends 25, 26 in rotatable engagement with respect to the support 11.

When the rod 32 is in the full line position of Fig. 2 it will be apparent that swinging of said rod in a vertical plane is effectively prevented. Thus, if the outer end of the rod is suddenly urged downwardly due to a strike the upper leg 14 of the rear U-shaped member 12 will engage the butt end of the rod while the lower leg 19 of the forward U-shaped member 13 will engage the rod at a point spaced from the butt end toward the outer end.

The resisting forces in such a case will be transferred through the base 1 to the gunwale of the boat or to whatever other relatively fixed object the device is mounted on.

When it is desired to remove the pole it is merely necessary to grasp the same and move it upwardly as shown in dotted line in Fig. 2 in which case the element 17 will be swung upwardly about the pivots 25, 26 and free from the device. It will be understood of course that during normal use the various loads brought to bear on the device will not cause such a vertical movement.

Figure 3:
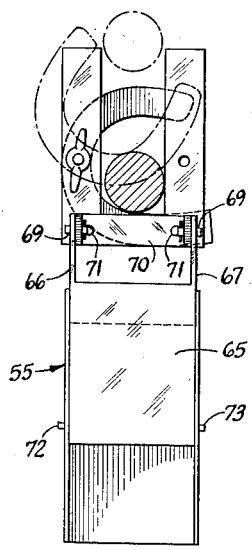
Fig. 3 is an end elevational view of a slightly different form of the invention.
Figure 4:
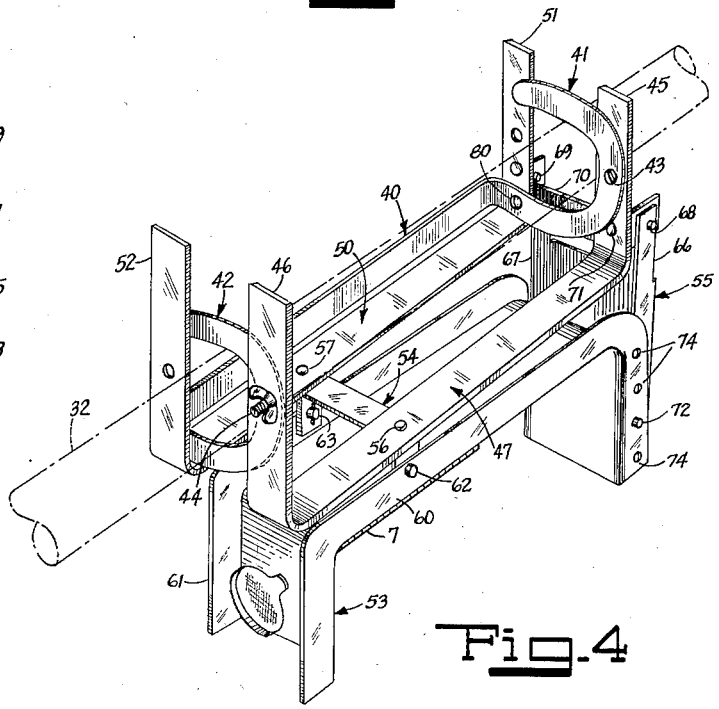
Fig. 4 is a perspective view of the device of Fig. 3.

A modified form of the device suitable for relatively heavy duty and having other advantages is shown in Figs. 3, 4.

An elongated rod holding element 40 having forward and rear U-shaped members 41, 42 respectively is pivotally supported by pivots 43, 44 to the upstanding legs 45, 46 of an upwardly opening channel member 47 (Fig. 4). This element 40 is similar to the element 17 of Figs. 1 and 2 and the legs 45, 46 of the channel member 47 are comparable to the legs 3, 5.

Another upwardly opening channel member 50 is positioned alongside member 47 but is spaced therefrom to permit vertical movement of the pole between said members. This member 50 is similarly provided with forward and rear legs 51, 52 which correspond with legs 2, 4 of Figs. 1, 2.

The members 47, 50 are secured to a C-clamp 53 by members 54, 55. The member 54 comprises a generally U-shaped member which is rigidly secured along its closed end as by rivets 56, 57 to the members 47, 50 respectively and which is releasably secured along its legs to the reinforcing flange portions 60, 61 of the C-clamp 53 by removable toggle pins or the like 62, 63.

The member 55 comprises a relatively wide web 65 provided with a pair of opposed flanges 66, 67 to form a channel member which opens inwardly toward the C-clamp 53 (Figs. 3, 4). This member 55 is pivotally connected at one of its ends by pins 68, 69 to the legs of a U-shaped member 70 similar to member 54. The member 70 is secured along its closed end to the supporting members 45, 51 respectively by rivets 71.

The other end of channel member 55 is pivotally secured in like manner as by removable pins 72, 73 to the flanges 60, 61 of C-clamp 53. Holes 74 for receiving pins 72, 73 permit vertical adjustment of member 55.

Thus, it is seen that the members 54, 70 secure the supports 47, 50 together in spaced relationship transversely of the length of the rod and the channel member 55 acts as an adjustable brace for positioning the supports 47, 50 at various angles as desired with respect to the C-clamp 53.

The action of the rod holding element 40 is identical to that of the element 17 of Figs. 1 and 2 and it will be apparent that the fishing rod may be released by simply moving it upwardly to swing the element 40 about pivots 43, 44. When the fishing rod is in position within the members 41, 42 and between the supports 47, 50 it will be apparent that any loads brought to bear on the device will be transferred to the supports 47, 50 and thence to the C-clamp 53.

A modified form of the structure of Figs. 3, 4 is shown in Figs. 5, 6 and may be employed in some cases where the load on the pole is heavy. The structure of Figs. 5, 6 is in all respects similar to that of Figs. 3, 4 except for the particular mounting means of the pole holding element. Inasmuch as the structure of Figs. 5, 6 may be produced from that of Figs. 3, 4, identical parts will be similarly numbered.

The holding element 40 of Fig. 6 is provided with an aperture 80 for passing a pin 81 through the U-shaped member 41 adjacent the extension 82 which connects said member with the corresponding member 42. This pin 81 is adapted to be passed through a complementarily formed hole on leg 51 of support 50 and secured thereto by wing nut 84. Similarly pin 85 passes through member 42 and leg 52 is provided with wing nut 86. By this modified form it will be seen that the U-shaped members 41, 42 will be swingably supported about points adjacent their open ends instead of about points adjacent their closed ends as shown in Figs. 3, 4.

A cross-piece 90 extends between legs 51, 45 and is secured thereto by means of screws 91 and nuts 92 (Figs. 6, 7). This cross piece 90 is preferably positioned just above the lower leg of U-shaped member 41 so that the load of the forward end of the fishing rod is taken by said cross piece 90 while the rear end is supported in U-shaped member 42, thus preventing upward swinging of the rear end of rod 32. Thus, the load on the rod is transferred directly to the supports 47, 50 through the cross piece 90 and no appreciable load is taken by the holding element 40.

When it is desired to remove the rod 32 it is merely necessary to thrust the butt end of the rod downwardly against the lower leg of the U-shaped member 42 to the dotted line position of Fig. 5 and lift the rod out of the device. It will be understood of course that downward swinging of member 42 will also cause the member 41 to swing downwardly thus permitting removal of the fishing rod 32. In use, the upper leg of member 42 will effectively prevent the rod 32 from swinging upwardly at its butt end upon the forward end being suddenly urged downwardly in the case of a strike. Only when the butt end of the rod is positively thrust downwardly will the rod be removable.

The device of Fig. 6 is adapted to be conveniently collapsed into the position shown in Fig. 7 by removing the pins 62, 63 which secure the supports 47, 50 to the clamp 53. The supports 47, 50 may then be swung through 180 degrees to the position of Fig. 7 with the supports 45, 51 between the jaws of the C-clamp 53. In this position the device is much easier to handle and is more compact than in the expanded working position.

The invention herein described is easily constructed without any expensive machining operations but is nevertheless accurate and dependable for different types of uses.

The exact structure herein described and detailed in the drawings is not to be taken as restrictive of the invention, as it is obvious that various changes in design may be made without departing from the invention.

I claim:

1. A holder for securing a fishing rod in generally horizontally extending fishing position from its handle end comprising; a pair of U-shaped members spaced apart and correspondingly positioned with the legs of each member extending horizontally one above the other and with their open sides directed laterally in the same direction, the spacing between the legs of each member being sufficient to freely receive said end of said pole therebetween and said legs being of sufficient length to fully extend across opposite sides of said pole at said end, a support for said members, pivot means for pivotally securing said members to said support at the return bends of said members for swinging said legs to generally vertically extending positions with said open sides of said members directed upwardly when said handle end of said pole is between the legs of said member and is lifted whereby said handle end may be freely lifted from said members, and means connecting said members for swinging as a unit, means carried by said support extending across said open sides of said members when the legs of the latter extend horizontally and said handle end of the pole is between said legs to prevent lateral movement of said handle end through said open sides.

2. A holder for securing a fishing rod in generally horizontally extending fishing position from its handle end comprising; a pair of U-shaped members spaced apart and correspondingly positioned with the legs of each member extending horizontally one above the other and with their open sides directed laterally in the same direction, the spacing between the legs of each member being sufficient to freely receive said end of said pole therebetween and said legs being of sufficient length to fully extend across opposite sides of said pole at said end, a support for said members, pivot means for pivotally securing said members to said support at the return bends of said members for swinging said legs to generally vertically extending positions with said open sides of said members directed upwardly when said handle end of said pole is between the legs of said member and is lifted whereby said handle end may be freely lifted from said members, and means connecting said members for swinging as a unit, said support comprising a base and a pair of generally upwardly extending elements on said base adjacent to each of said members, said members being respectively secured by said pivot means to one of the elements of each pair thereof and the other element of each pair extending across the open side of each member when said handle end of said rod extends between the legs of said members to prevent lateral movement of said handle end out of said open sides of said members and the spacing between the legs of each pair being sufficient to receive said handle end therebetween.

THOMAS C. NORMAN.

REFERENCES CITED

The following references are of record in the file of this patent:

UNITED STATES PATENTS

| Number | Name | Date |
|---|---|---|
| 2,199,034 | Witczak | Apr. 30, 1940 |
| 2,200,183 | Legg | May 7, 1940 |
| 2,392,865 | Smith | Jan. 15, 1946 |
| 2,458,881 | Steuer | Jan. 11, 1949 |